United States Patent

Koneczny et al.

[11] Patent Number: 5,263,665
[45] Date of Patent: Nov. 23, 1993

[54] MOUNTING BRACKET FOR HOLDING A HEAT INSULATING MAT, ESPECIALLY IN AN AIRCRAFT

[75] Inventors: Manfred Koneczny, Hamburg; Hartmut Tijssen, Wedel, both of Fed. Rep. of Germany

[73] Assignee: Deutsche Aerospace Airbus GmbH, Hamburg, Fed. Rep. of Germany

[21] Appl. No.: 32,126

[22] Filed: Mar. 17, 1993

[30] Foreign Application Priority Data

Mar. 17, 1992 [DE] Fed. Rep. of Germany ....... 4208494

[51] Int. Cl.⁵ .................................. B64C 1/12
[52] U.S. Cl. .................. 244/117 R; 24/297; 411/510; 411/458; 411/457
[58] Field of Search ............... 244/117 R, 119, 129.1, 244/118.5; 52/698, 702, 508; 411/508, 510, 454, 457, 458, 908; 24/297, 289, 326, 457

[56] References Cited

U.S. PATENT DOCUMENTS 4,739,955 4/1988 Aquino et al. .................. 244/129.4
4,906,155 3/1990 Balza .................. 411/510

FOREIGN PATENT DOCUMENTS 0320377 6/1989 European Pat. Off. .

*Primary Examiner*—Michael S. Huppert
*Assistant Examiner*—Anne E. Bidwell
*Attorney, Agent, or Firm*—W. G. Fasse

[57] ABSTRACT

A mounting bracket for holding a heat insulating mat in an aircraft cabin has a lower and an upper section configured to conform to a trough-shaped flange of a stringer secured to the fuselage. A holding pin forms part of the lower section and can be connected to the insulating mat. The two sections are onto the stringer (2) as a clip. For this purpose the lower section (4) fits with a trough (10) around the stringer (2) and the upper section (5) formed with a snap-in locking device including an expander pin (9) is arranged with a barrel portion in the trough of the stringer. The upper section (5) has a plate (14) tangentially merging into the barrel portion and extending outside the stringer (2) for the snap-in action.

12 Claims, 2 Drawing Sheets

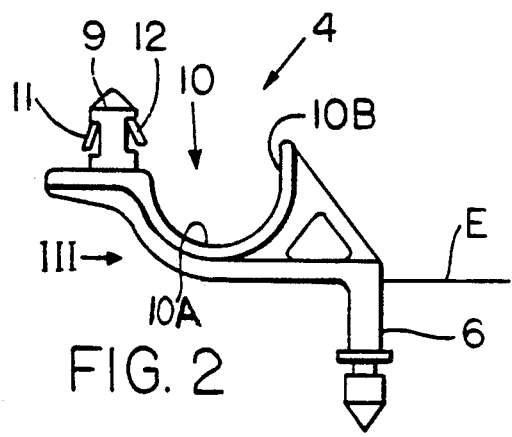
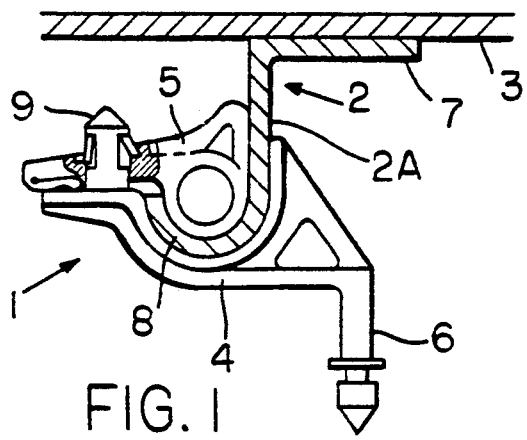
FIG. 2  FIG. 1
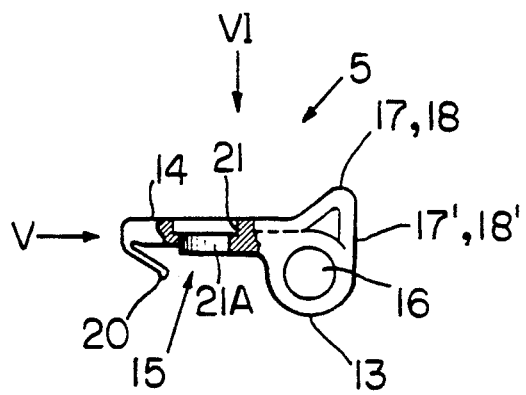
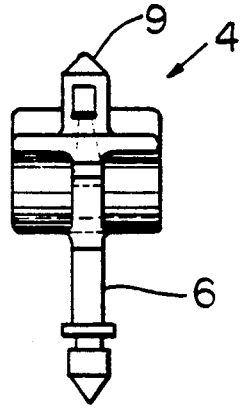
FIG. 4  FIG. 3
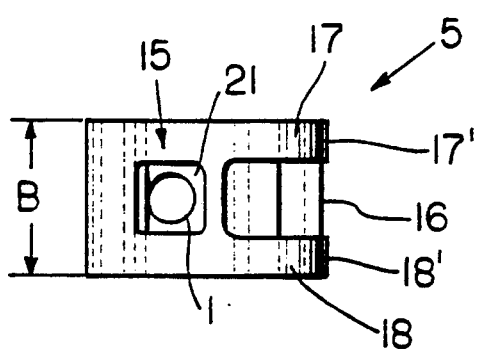
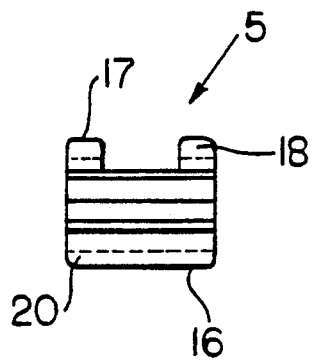
FIG. 6  FIG. 5

MOUNTING BRACKET FOR HOLDING A HEAT INSULATING MAT, ESPECIALLY IN AN AIRCRAFT

FIELD OF THE INVENTION

The invention relates to a mounting bracket for holding a heat insulating mat in an aircraft cabin, wherein the mounting bracket is fastened to a stringer of the fuselage. The mounting bracket has a holding pin that can be connected to the insulating mat. A certain number of such mounting brackets are necessary for each insulating mat.

BACKGROUND INFORMATION

European Patent Publication EP 320,377 A1 discloses a mounting bracket for holding a heat insulating mat in an aircraft cabin. The mounting bracket is fastened to a stringer of the fuselage and has a holding pin that can be connected to the insulating mat. The bracket can be produced of synthetic material. In order to fasten the mounting bracket, it has a claw and an expander pin formed so that the claw grasps around the flanging of the stringer and so that the expander pin can be inserted in a bore-hole in the cross-web of the stringer. The bore-holes create a weak point in the surface protection of the stringer and cause a considerable effort and expense in the production of the aircraft structure.

OBJECTS OF THE INVENTION

In view of the foregoing it is the aim of the invention to achieve the following objects singly or in combination:

to construct a mounting bracket of the type described above, so that no bore-holes are needed in the cross-web of the stringer for fastening the bracket;

to avoid damage to the surface protection of the stringer when a bracket is secured to the stringer; and to construct the bracket so that it takes advantage of the shape of the stringer for clamping the bracket to the stringer.

SUMMARY OF THE INVENTION

The foregoing objects have been achieved according to the invention in that the mounting bracket is formed as a two-component clip that can be set onto the stringer. The bracket has a bottom section with a trough for the stringer and an upper locking section, wherein an expander pin is attached on the side of the bottom section and a holding fixture, that is locked onto the expander pin, is attached on the side of the upper section. Further, the locking pin is connected as one piece or integral part with the bottom section and the trough comprises a curved portion and a flat portion. The upper section is formed as a platform or plate, that has a rounded edge facing the stringer and a fitted equalizer spring on the edge facing away from the rounding. The equalizer spring is preferably formed as an integral extension of the upper bracket section.

This construction of the invention has the special advantage that the conventional bore-hole in the cross-web of the stringer is no longer needed, so that the construction expenses are significantly reduced and the surface protection of the stringer is not damaged.

BRIEF DESCRIPTION OF THE DRAWINGS

In order that the invention may be clearly understood, it will now be described, by way of example, with reference to the accompanying drawings, wherein:

FIG. 1 is a side view of a mounting bracket according to the invention with an upper section and a bottom section clamped to a stringer shown in section;

FIG. 2 shows a view of the bottom section of the present mounting bracket;

FIG. 3 is a view in the direction of the arrow III in FIG. 2 of the bottom bracket section;

FIG. 4 is a side view of the upper bracket section;

FIG. 5 is a view in the direction of the arrow V in FIG. 4 of the upper bracket section;

FIG. 6 is a view in the direction of the arrow VI in FIG. 4 of the upper bracket section;

Figure 7:
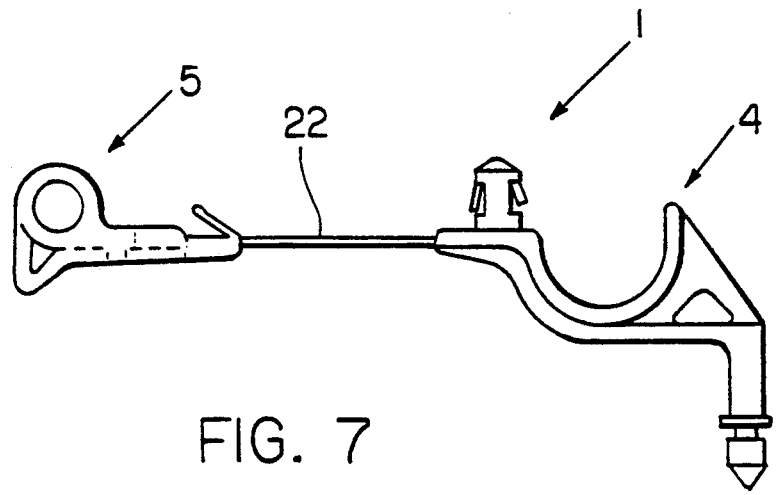
FIG. 7 shows the present mounting bracket before mounting.

DETAILED DESCRIPTION OF PREFERRED EXAMPLE EMBODIMENTS AND OF THE BEST MODE OF THE INVENTION

FIG. 1 shows the present mounting bracket 1 in a mounted condition whereby a heat insulating mat, not shown, is secured to a downwardly extending holding pin 6 in an aircraft cabin. The mounting bracket 1 is made of thermoplastic synthetic material and is fastened by a clamping action to a stringer 2 of a fuselage structure 3. The stringer 2 is conventionally connected to the outer layer or wall of the fuselage enclosing the cabin. In order to produce the clamping action, the mounting bracket 1 is formed as a two-section clip, comprising a bottom section 4 and an upper section 5. The holding pin 6 is preferably connected as an integral portion of the bottom section 4. The upper section 5 is formed as a locking component for snapping into a trough 8 of the stringer 2. The stringer 2 has an approximately S or Z-shaped cross-section with a flange 7 connected to the outer wall 3, a cross-web 2A and the trough 8 also forming a flange on its cabin side.

For producing the interlocking connection between the bottom section 4 and the upper section 5 and thus between the bracket 1 and the stringer 2, the lower section 4 is provided with an expander pin 9, which engages into a holding fixture in the form of a bore-hole 21A in the upper section 5, when the bottom and upper sections 4 and 5 are brought together. The locking pin 9 as such is of known construction. The bore 21A is seen in FIG. 4.

In order to fasten an insulating mat, a plurality of such mounting brackets are needed. Each insulating mat has holes for engaging the holding pins 6 when the mat is pushed upwardly against these holding pins 6. Subsequently, the insulating mat is secured by means of elastic locking discs, not shown in the drawing, for engaging the groove behind the points of the holding pins 6.

FIGS. 2 and 3 show the bottom section 4 of the mounting bracket 1 with the holding pin 6 and the expander pin 9. The bottom section 4 has a trough 10 on the side facing the outer cabin wall 3. The trough 10 is shaped to fit the outer corresponding trough contour 8 of the stringer 2. Thus, the lower section 4 comprises a curved portion 10A for engaging the outer countour 8 and a flat portion 10B for engaging the web 2A of the stringer 2. The expander pin 9 has two unequal barblike expanding springs 11 and 12. The expanding spring 11 has a smaller wall thickness than the spring 12 and reaches closer to the foot of the expander pin 9 than the spring 12. The bottom section 4 of the bracket 1 is formed so that the main plane E runs substantially parallel to the outer wall 3 of the fuselage, shown in FIG. 1, when the mounting bracket 1 is properly mounted to the stringer 2. Since in the mounted condition the holding pin 6 should stand almost vertically and perpendicularly to the outer wall 3. The pin 6 also stands perpendicularly to the main plane E.

FIGS. 4 and 6 show the upper section 5 of the mounting bracket 1 with a round barrel portion 13 and a plate 14 with a holding fixture 15. The round barrel portion 13 is formed by the outer surface of a hollow cylinder 16. The plate 14 extends nearly tangentially to the cylinder 16 and is preferably formed as an integral, one piece structure with the cylinder 16, whereby the width B of the plate 14 corresponds to the length of the hollow cylinder 16.

In FIG. 4 there are two clamping protrusions 17 and 18 arranged above the hollow cylinder 16. Each clamping protrusion 17, 18 forms a level plane 17' or 18' with the round barrel portion 13. These level planes 17', 18' merge into the round barrel portion 13 tangentially. An equalizer spring 20 is formed on the edge of the plate 14 facing away from the round barrel portion 13. The spring extends or points diagonally downwardly toward the round barrel portion 13. This equalizer spring 20, which is shaped as a flat leaf spring, extends over the entire width of the plate 14 and forms an angle of about 30° with said plate 14. The holding fixture 15 comprises the above mentioned through-hole 21A surrounded by a rectangular shoulder 21 arranged on the upper side of the plate 14 and surrounding the through-hole 21A of the holding fixture 15.

FIG. 7 shows a modified embodiment of the invention, wherein the bottom section 4 and the upper section 5 are connected to each other by a thin thread or strip-like connecting element 22. This feature makes sure that when the bracket needs to be assembled, there are always both sections 4 and 5 at hand, namely an upper section 5 for each bottom section 4 and vice versa.

Figure 8:
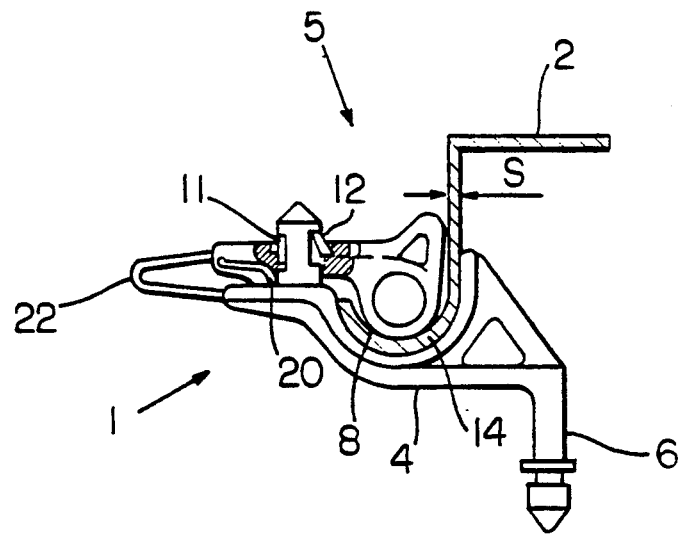
FIG. 8 shows the present mounted bracket.

FIG. 8 shows again the mounting bracket 1 in the mounted condition on the stringer 2, the bottom section 4, the upper section 5 and the holding pin 6. The bottom section 4 is attached to the stringer 2 and the upper section 5 is connected to the bottom section 4 by the expander pin 9, whereby the round barrel portion 13 lies against the inside 14 of the trough 8 of the stringer 2. The free end of the expanding spring 12 is supported on the surface of the shoulder 21, whereby the spring 12 holds the bottom section 4 and the upper section 5 together. On the other hand, the free end of the expanding spring 11 is clearly inside the through-hole 21A of the holding fixture 15 and therefore rests against the inner surface of the through-hole 21A of the holding fixture 15, under an initial tension. This feature makes sure that the expander pin 9 has a position free of play inside the holding fixture 15 in the direction diagonally to the stringer 2. In the mounted condition, as FIG. 8 shows, the equalizer spring 20 is tensed and exerts pressure on the bottom section 4. Therefore, a momentum rotating around the free end of the expanding spring 12 influences the upper section 5, so that the trough portion of the stringer 2 is clamped in between the trough 10 of the bottom section 4 and the round barrel portion 13 of the upper section 5. The dimensions of the equalizer spring 20 are chosen, so that sufficiently high clamping forces are achieved even in the case of varying stringer thicknesses S. The stringer 2 shown here has a smaller wall thickness than the stringer of FIG. 1. The upper section 5 thus seems to be tilted around a larger angle by the influence of the equalizer spring 20, than shown in FIG. 1. The strip-like connecting element 22 has the shown bent shape when it is in the mounted condition.

Although the invention has been described with reference to specific example embodiments, it will be appreciated that it is intended to cover all modifications and equivalents within the scope of the appended claims.

What we claim is:

1. A mounting bracket for holding a mat, especially a heat insulating mat in an aircraft cabin, said bracket being adapted for securing to a stringer (2), comprising an upper bracket section (5) and a lower bracket section (4), said upper bracket section comprising first means (16) for engaging a portion of said stringer (2) and first snap-in locking means (15) for securing said upper bracket section (5) to said lower bracket section (4), said lower bracket section (4) comprising second means (10A, 10B) for engaging said portion of said stringer (2) and second snap-in locking means (9) for cooperation with said first locking means (15) for securing said upper and lower bracket sections (5 and 4) to each other and to said stringer portion without any penetration of said stringer, said lower bracket section further comprising means (6) for securing said mat to said mounting bracket.

2. The mounting bracket of claim 1, wherein said first snap-in locking means comprise a holding fixture (15), wherein said second snap-in locking means comprise an expander pin (9) for engaging said holding fixture (15).

3. The mounting bracket of claim 2, wherein said second snap-in locking means comprise an expander pin (9) having two barblike expanding springs (11) and (12) of varying lengths wherein one of said barblike expanding springs is longer than the other for engaging said first snap-in locking means.

4. The mounting bracket of claim 3, wherein a free end of the longer expanding spring (11) lies inside said holding fixture (15) in a mounted condition.

5. The mounting bracket of claim 3, wherein a free end of said shorter expanding spring (12) lies outside of the holding fixture (15) in the mounted condition.

6. The mounting bracket of claim 2, wherein said holding fixture of said first snap-in locking means comprise an extension plate (14) of said upper bracket section (5), a through-hole in said extension plate, and a rectangular indentation (21) forming a shoulder arranged on the upper surface of said extension plate (14).

7. The mounting bracket of claim 1, wherein said stringer (2) has a lower trough flange, wherein said first means for engaging have a barrel portion to be received in said trough flange, and wherein said second means for engaging have a trough for receiving said trough flange, whereby said trough flange of said stringer is received between said barrel portion and said trough when said mounting bracket is secured to said stringer with said first and second snap-in locking means engaging each other.

8. The mounting bracket of claim 1, wherein said upper bracket section comprises a plate portion having a through-hole and a shoulder surrounding said through-hole forming said first snap-in locking means, and wherein said lower bracket section comprises an extension carrying a snap-in pin (9) forming said second snap-in means, said snap-in pin (9) having at least one spring element (12) for engaging said shoulder when said pin extends through said through-hole to prevent an unintended release.

9. The mounting bracket of claim 4, wherein said upper bracket section comprises a barrel portion from which said plate portion extends, and wherein said lower bracket section has a trough with a curved portion (10A) and a flat portion (10B) for engaging respective stringer portions from one side while said barrel portion engages said stringer on an opposite side when said bracket is installed.

10. The mounting bracket of claim 9, wherein said plate portion of said upper bracket section comprises an equalizer spring (20) extending from said plate portion opposite said barrel portion for bearing against an upwardly facing surface of said lower bracket section when said bracket sections are installed.

11. The mounting bracket of claim 1, further comprising a flexible connecting means (22) interconnecting said lower bracket section (4) and said upper bracket section (5), said connecting means being sufficiently flexible for permitting a snap-in connection of said bracket sections to each other and to said stringer without severing said connecting means.

12. The mounting bracket of claim 1, made of thermoplastic material.

* * * * *

UNITED STATES PATENT AND TRADEMARK OFFICE
CERTIFICATE OF CORRECTION

PATENT NO. : 5,263,665
DATED : November 23, 1993
INVENTOR(S) : Manfred Koneczny et al.

It is certified that error appears in the above-identified patent and that said Letters Patent is hereby corrected as shown below:

On the title page
in [57] Abstract, line 6, after "are" insert --snapped--;
Column 5, line 5, replace "claim 4" by --claim 8--.

Signed and Sealed this

Nineteenth Day of April, 1994

Attest:

BRUCE LEHMAN

*Attesting Officer*     *Commissioner of Patents and Trademarks*